United States Patent [19]

Anderson et al.

[11] Patent Number: 4,922,814
[45] Date of Patent: May 8, 1990

[54] SINGLE HEAD JUICE EXTRACTOR

[76] Inventors: David N. Anderson, 2818 Elizabeth Pl.; Guillermo T. Segredo, 1720 Rosshire Ct., both of Lakeland, Fla. 33813

[21] Appl. No.: 310,111

[22] Filed: Feb. 14, 1989

Related U.S. Application Data

[62] Division of Ser. No. 242,845, Sep. 12, 1988.

[51] Int. Cl.⁵ .......................... A23N 1/02; B30B 9/02
[52] U.S. Cl. ........................................ 99/510; 99/495; 100/98 R; 100/108; 100/213
[58] Field of Search ................. 99/495, 496, 509, 510, 99/513; 100/37, 39, 98 R, 105–108, 117, 213, 292

[56] References Cited

U.S. PATENT DOCUMENTS

| 2,234,880 | 3/1941 | Skinner et al. | 99/495 X |
| 2,591,510 | 4/1952 | Clark | 100/98 R |
| 2,649,730 | 8/1953 | Hait | 100/213 |
| 2,723,618 | 11/1955 | Matthews | 100/213 |
| 4,154,163 | 5/1979 | Niemann | 100/213 |
| 4,309,943 | 1/1982 | Larsen et al. | 99/509 |
| 4,700,620 | 10/1987 | Cross | 99/510 |

Primary Examiner—Timothy F. Simone

[57] ABSTRACT

A juice extractor uses two commonly driven crank arm drive systems to provide a low profile juice extractor.

13 Claims, 3 Drawing Sheets

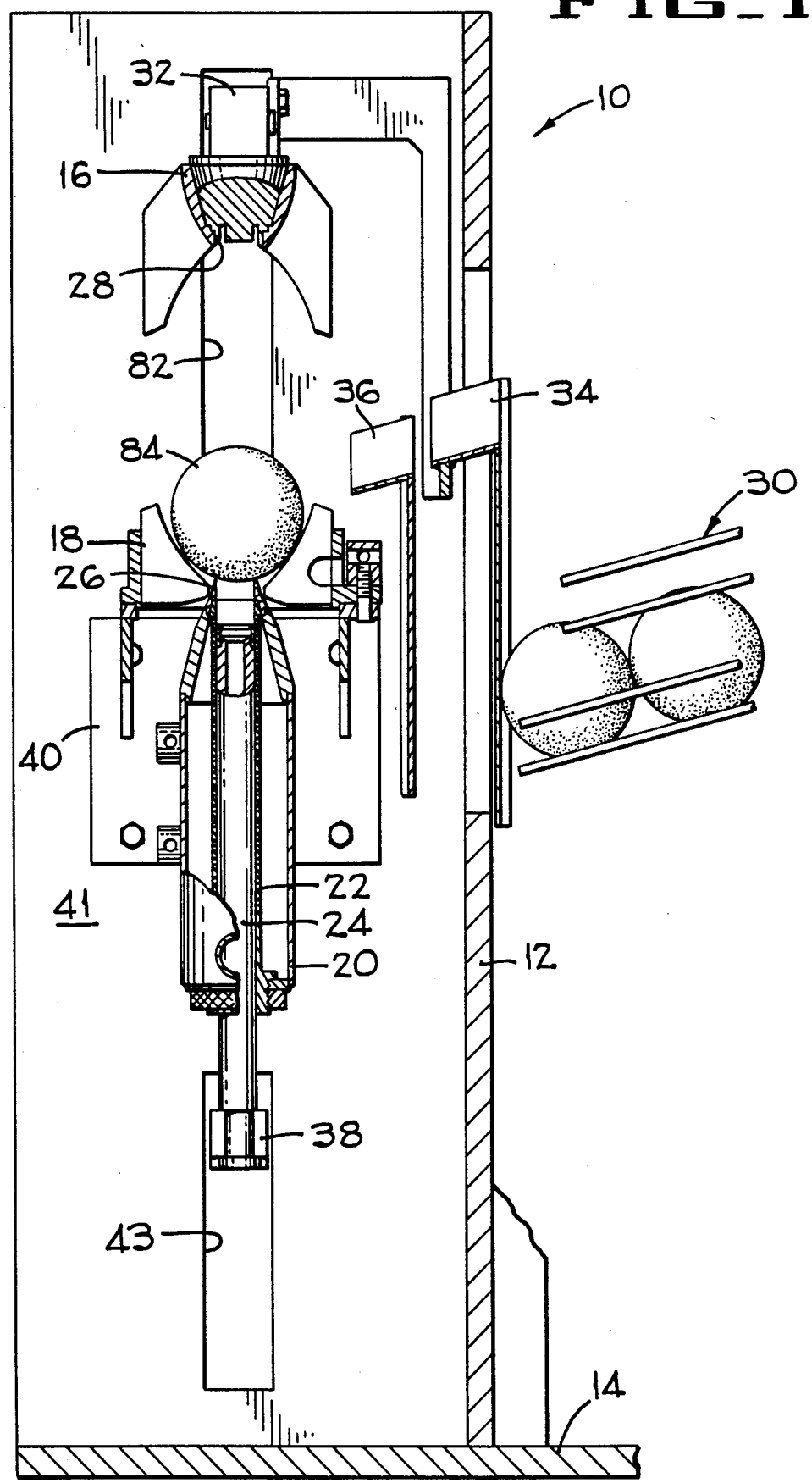

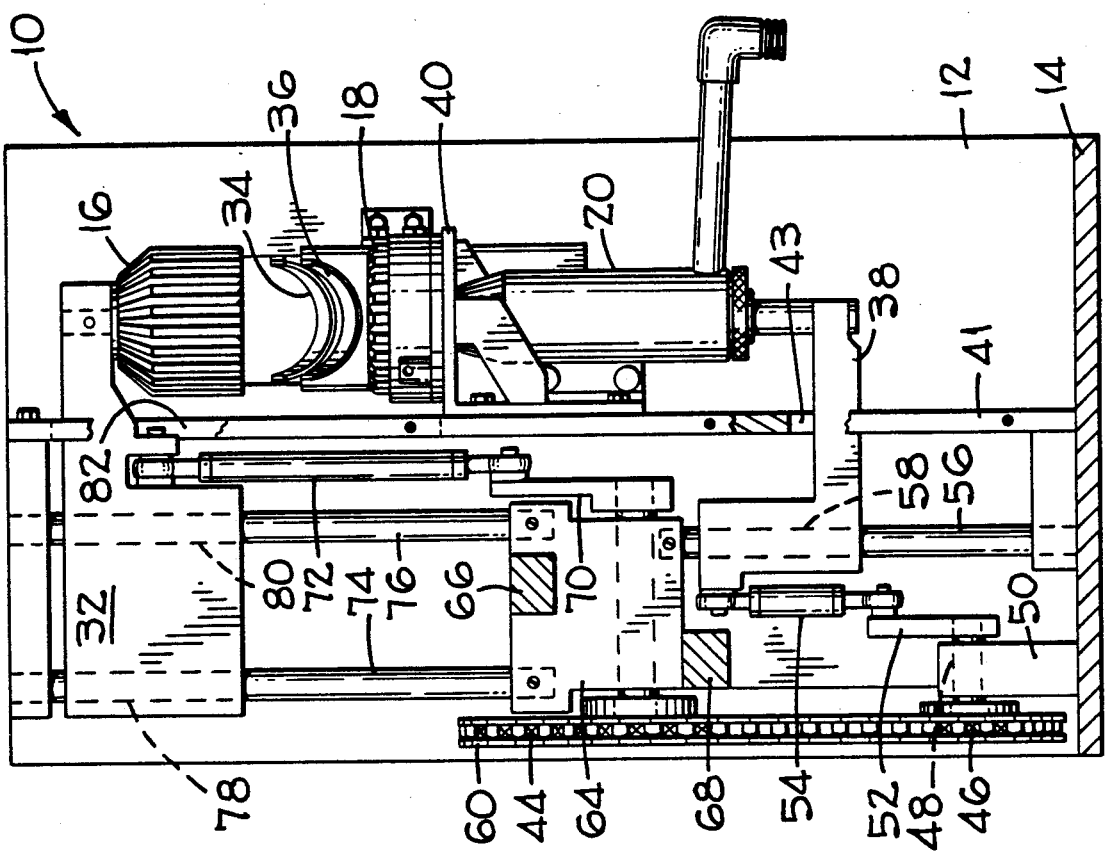
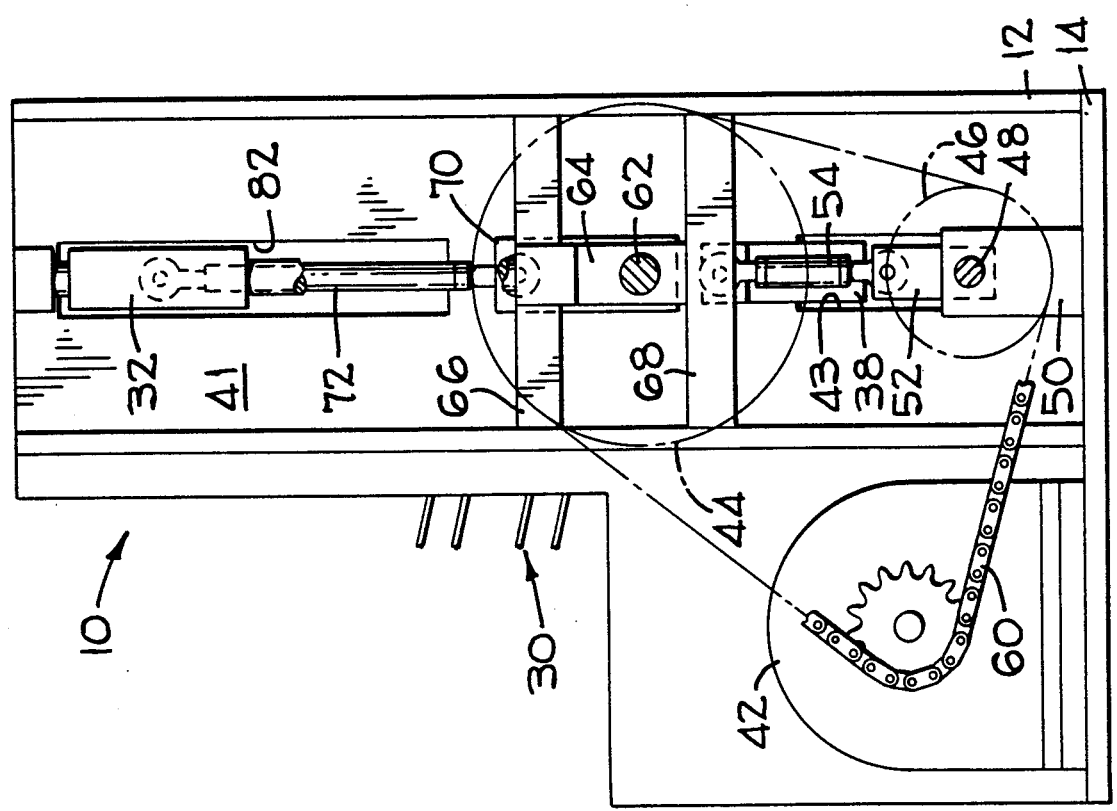

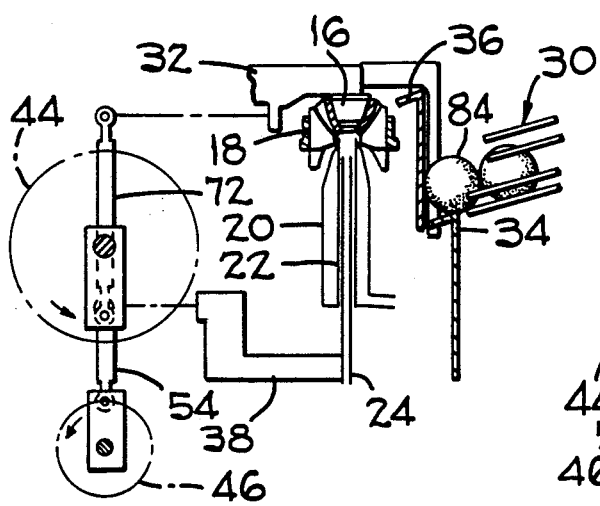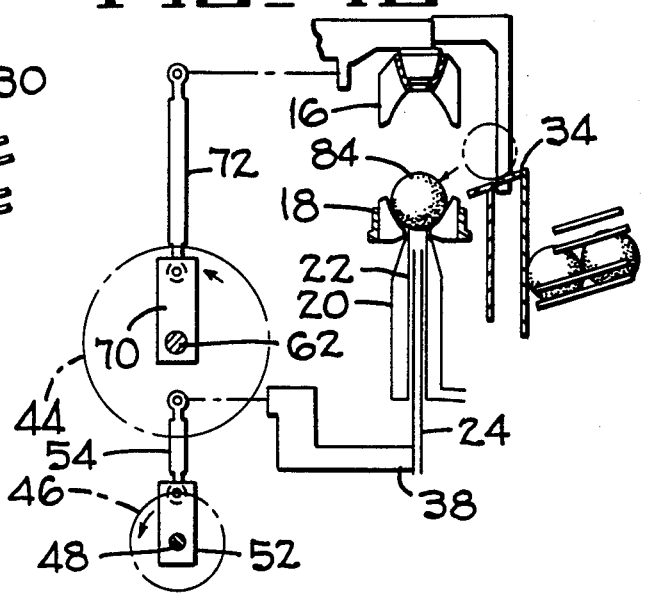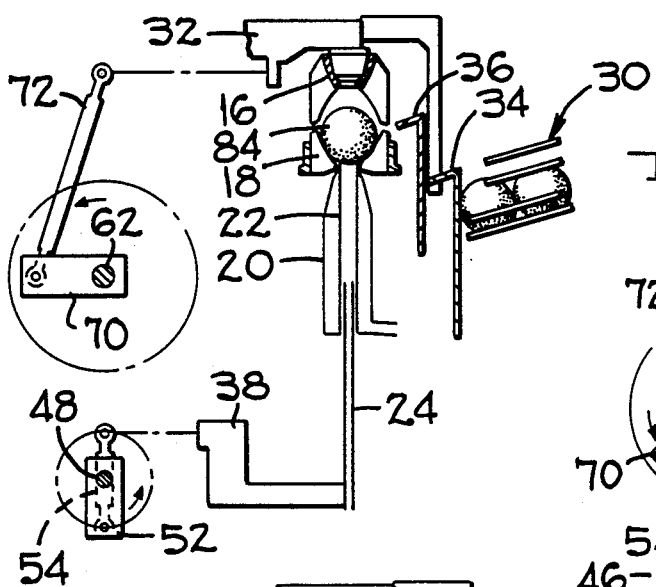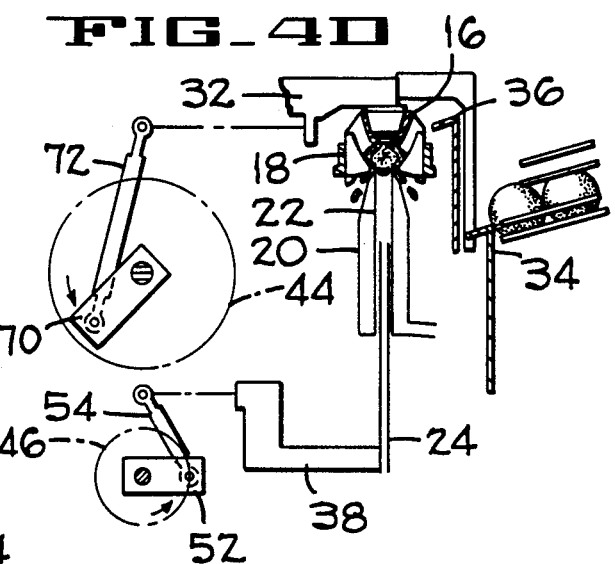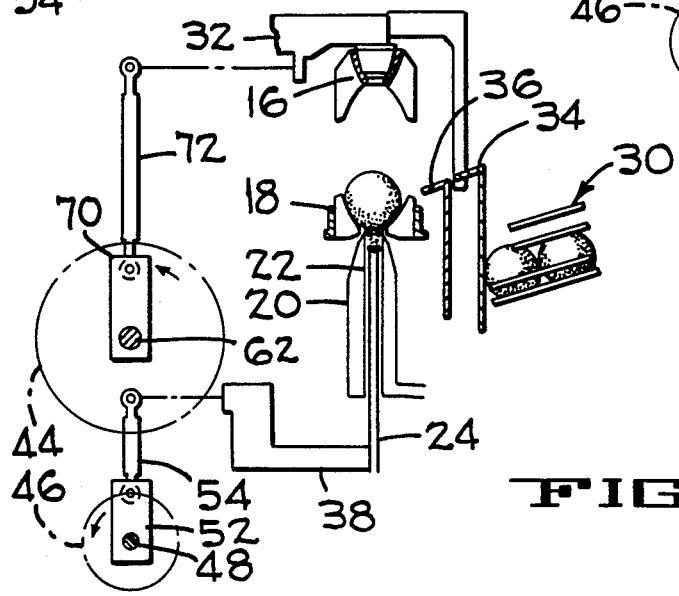

SINGLE HEAD JUICE EXTRACTOR

This is a division of application Ser. No. 242,845, filed 9/12/88.

BACKGROUND OF THE INVENTION

The present invention relates to fruit processing equipment and more particularly concerns an improved citrus juice extractor having a cantilevered drive system.

The extraction of juice from citrus fruits such as oranges has been accomplished successfully for a number of years using well known interdigitating cups and orifice tube type juice extractors. Such extractors are made by the FMC Corporation and have been disclosed in now expired U.S. Letters Patent. Improvements to the basic two cup interdigitating extractors continue to be made however.

The invention set forth herein is an improved two cup interdigitating fruit juice extractor that is designed to have a lower height or profile as compared to currently available two cup interdigitating juice extractors due to a unique drive system. This compact design is directly due to the cantilevered arms of the units being driven by the unit's crank arm drive assembly. One object of this invention is to provide juice extracting equipment that has high yield capability and better juice quality than existing juice extractors for point of sale installations such as fruitstands, supermarkets and in mobil equipment.

The prior art two cup interdigitating juice extractors are large machines that have been designed for high volume production situations. Numbers of these large, high volume juice extractors would be ganged together in the juice room of a juice producer to take advantage of the economies of scale of shipping fruit to a central location, storage and processing of large quantities of fruit juice and packing and shipping of the juice.

This invention is not necessarily directed at providing equipment for a large juice extractor plant, but, as stated earlier is designed for the high yield production of juice and high quality juice at relatively low volumes for point of sale installations.

Other point of sale or portable juice extractors exist however none that incorporate the two cup interdigitating fruit cups and the orifice tube apparatus with the drive disclosed herein are known to the applicants. Typically point of sale juice extractors are not as selective in juice extracting—that is, extracting juice having low oil content and low incidences of seeds and pulp—as the instant invention.

By providing a cantilevered drive system a very sophisticated juice extractor can be packaged in a fraction of the space taken up by a conventional two cup extractor as the vertical drive mechanism of the conventional, well known extractor is not used.

The manner in which these and other features of the present invention can be obtained in practice will be apparent from the following detailed description of a preferred embodiment of the invention.

BRIEF DESCRIPTION OF THE DRAWINGS

FIG. 1 is a partially fragmented and sectioned front elevation view (with drive elements left off for clarity) of the fruit juice extracting apparatus.

FIG. 2 is a partially fragmented and sectioned side elevation view of the fruit juice extractor including portions of the drive mechanism.

FIG. 3 is a partially fragmented rear elevation view of the significant portions, for purposes of this specification of the fruit juice extractor of FIG. 1.

FIGS. 4 A-E are schematic presentations of the relative positions of the fruit juice extractor elements as they are driven through a typical extraction cycle.

DETAILED DESCRIPTION OF THE INVENTION

The general arrangement of the juice extractor can best be understood by a review of the FIG. 1 presentation.

In the Figure the juice extractor, generally 10 is provided with a housing 12 supported on a base 14, which houses and supports the extractor apparatus. For the most part, the actual extractor apparatus includes well known components including an upper cup 16, a lower cup 18, a juice collecting sump 20, a strainer tube 22 and an orifice tube 24. The well known components operate in a well known manner wherein the upper cup 16 is vertically directly above the lower cup 18 as shown in each of the drawing figures. The upper cup 16 is caused to reciprocate in a straight line vertically into and out of the lower cup 18 as is shown in the sequence set forth in FIG. 4. A conventional tubular knife 26 and a receiver for the knife 28 are also provided. The upper cup and the lower cup are each formed of intersticial or interdigitating fingers that fit between adjacent fingers of the other cup when the cups are urged together to squeeze the juice out of the fruit. In the preferred embodiment presented herein, the lower cup 18 is fixedly mounted to the base 14 and housing 12 through the use of a mounting plate 40 which is fastened to an internal wall 41 of the juice extractor. The juice sump 20 and its contained strainer tube 22 are attached to the mounting plate 40. The internal wall 41 is fastened to the frame of housing 12 of the juice extractor.

The juice extraction process, in a simple example, proceeds as follows. The strainer tube 22 hosting the tubular knife 26 will be forced into the peel of the fruit to sever the peel. The contents of the peel—that is, the fruit—will be forced into the strainer tube 22 as the upper cup 16 is urged into the lower cup 18. The fruit is substantially all contained in the strainer tube 22 while the peel of the fruit is extruded between the fingers of the cups for ultimate collection and appropriate disposal.

The fruit now contained in the strainer tube 22 is compressed upwardly by the orifice tube 24 causing the fruit juice to be extracted from or squeezed from the entrapped fruit in the strainer tube 22 and drained through small diameter orifices in the strainer tube into the juice collecting sump 20. Multiple strokes per machine cycle of the fruit in the strainer tube 22 by the orifice tube 24 are contemplated by this invention. From the juice collecting sump 20, the juice is drained to a collection receptical.

FIG. 1 shows components that are unique to the presented preferred embodiment including a feed chute generally 30, an upper cup reciprocating support structure 32, a fruit lift 34 that is attached to and reciprocates with the upper cup reciprocating support structure 32, and a fruit bridge 36. The orifice tube 24 is mounted for reciprocal movement on an orifice tube reciprocating support structure 38.

FIGS. 2 and 3, wherein like reference characters as recited in FIG. 1 refer to the same parts, are views of the juice extractor that illustrate the invention being presented.

These Figures shown the drive motor 42, which in a preferred embodiment could be a gear motor; driven sprockets; an upper cup reciprocating support structure driven sprocket 44 or upper cup sprocket; and an orifice tube reciprocating support structure drive sprocket 46 or orifice tube sprocket. The orifice tube sprocket 46 turns a shaft 48, supported in a bearing block means 50, which has a crank arm 52 fixedly mounted to the shaft 48. Attached to the outboard end of the crank arm 52 is a rod 54 that connects the crank arm 52 to the orifice tube reciprocating support structure 38. The orifice tube reciprocating support structure 38 is guided for reciprocal movement through the use of a pair of bearing columns, one shown as 56 which passes through bushed bearing passages such as 58 in the orifice tube reciprocating support structure 38. The orifice tube reciprocating support structure 38 extends through an aperture 43 in the internal wall 41. It is apparent that as the motor drives the orifice tube sprocket 46 through the expedient of the chain 60, the orifice tube 24 will be moved vertically upwardly and downwardly by the linkage just described.

Although a chain and sprocket assembly is shown, it is also contemplated that a gear train drive means or a belt drive means between the motor and the two driven linkages, that is, the orifice tube drive linkage and the upper cup drive linkage (described ahead), could be used with equal facility.

The "action" of the upper cup is controlled and driven by the upper cup sprocket 44 which is also driven, and is simultaneously driven by endless chain 60 through the motor 42. The upper cup sprocket 44 is journalled on a shaft 62 which is supported by a mounting block 64 which is supported by supports 66 and 68 mounted to the housing 12 of the juice extractor. The shaft 62 is fastened at its other end to an upper cup drive crank arm 70. An upper cup drive rod 72 connects the upper cup drive crank arm 70 to the upper cup reciprocating support structure 32 to which the upper cup 16 is attached. The upper cup reciprocating support structure 32 is guided by bearing columns to 74 and 76 which pass through bushed bearing apertures 78 and 80 in the upper cup reciprocating support structure 32. A portion of the reciprocating support structure, that portion to which the upper cup is attached, passes through aperture 82 in the internal wall 41.

The upper cup sprocket 44, in a preferred embodiment, is twice the diameter of the orifice tube sprocket 46, having 48 teeth and 24 teeth respectively. The gear motor 42 has an output of 100 RPM with a 14 tooth drive sprocket. The gear motor is a one and a half horse power motor in this preferred embodiment configuration. Other gear ratios are possible.

Since the ratio of the upper cup sprocket 44 to the orifice tube sprocket 46 is 1:2 the orifice tube sprocket will rotate twice for each machine cycle. In prior art large capacity juice extractors, the orifice tube 24 would only be driven through the strainer tube 22 once per cycle but with the 1:2 ratio of the instant invention, the orifice tube 22 will be cycled to actually squeeze the fruit in the strainer tube 22 at a speed to simulate a cam motion used in commercial extractors to obtain the same juice yield as a commercial extractor.

One machine cycle of juice extraction from a single fruit is shown somewhat pictorially in FIGS. 4A-4E. In these figures, the fruit, for instance an orange 84, has been served to the juice extractor by the feed chute generally 30. The orange to be squeezed is held on the fruit chute of the fruit lift 34, which, as shown in FIG. 1 is attached to the upper cup reciprocating support structure 32 so that it moves with the upper cup reciprocating support structure 32. As the upper cup reciprocating support structure 32 is lifted by the linkage and rotated to top dead center by the upper cup reciprocating support structure driven sprocket 44 the fruit lift 84 will lift the orange to the top of the fruit bridge 36 and allow the orange to roll across the fruit bridge to nest in the lower cup 18. It should be noted that the fruit bridge 36 has a barrier wall portion that blocks the fruit from leaving the fruit lift 34 until the fruit reaches the fruit bridge transverse surface.

FIG. 4B shows the upper cup sprocket 44 at top dead center and this could be considered the start of a complete cycle. At this point there is an orange resting in the lower cup 18, the fruit lift 34 has a fruit lift wall blocking the next orange from leaving the feed chute 30, the orifice tube 24 is at an up position with its orifice tube sprocket 46 at 0° into its first of two rotations per each machine cycle.

In FIG. 4C the upper cup sprocket 44 has advanced 90° in its cycle and the orifice tube sprocket 46 has advanced to 180° in its cycle as it is driven at twice the rotational speed of the upper cup sprocket 44. Functionally the orifice tube 24 has not advanced into a squeezing position at this stage of the machine cycle. The upper cup 16 however has closed in toward the lower cup 18 and the orange is about to be squeezed in a well known manner.

In FIG. 4D the squeezing has been started, the upper cup sprocket 44 has advanced another 45° and the orifice tube sprocket 46 has advanced another 90°. The upper cup sprocket 44 still has 45° of motion left to complete the compression of the fruit before the upper cup 6 starts away from the lower cup 18. The orifice tube 24 has partially squeezed the juice out of the fruit. As the cycle continues the orifice tube 24 will be moving to the top of the strainer tube 22 as the orange is forced into the strainer tube 22. When the upper cup sprocket 44 is at bottom dead center (180°) as shown in FIG. 4A the orange will be completely compressed and the orifice tube 24 will be at the top of its stroke.

The timing between the upper cup sprocket 44 and the orifice tube sprocket 346 in a preferred embodiment is as shown in FIG. 4 however, the crank arms 52 and 70 could be rotated around their respective shafts to adjust the timing of the relationship between the squeezing of the fruit and the orifice tube compression cycle.

Another embodiment is contemplated wherein the orifice tube 24 could be driven through the strainer tube 22 more than twice per machine cycle.

By using the crank arm drive for the orifice tube drive the costly cam actuated orifice tube drive system familiar in the heretofore well known juice extractors has been eliminated. This benefit results in a cost efficient juice extractor that has a low profile and is superior to other extractors for use in point of sale applications.

The following claims attempt to reserve for the inventors all rights in the invention presented herein to the extent possible under the law. Nuances of design that don't depart from the spirit and broad scope of these claims are considered to be covered by them.

What is claimed is:

1. In a single head juice extractor comprising a frame means, lower cup means mounted to said frame means, juice collecting sump mounted to said frame means proximate to said lower cup means, orifice tube means mounted for reciprocal movement through said juice collecting sump, the improvement comprising:

upper cup reciprocating support structure supported for reciprocal motion on said frame means laterally adjacent said lower cup means, upper cup means supported in a cantilevered manner by said upper cup reciprocating support structure directly above said lower cup means, said upper cup means capable of being moved vertically with said upper cup reciprocating support structure into and out of said lower cup means, means to reciprocate said upper cup reciprocating support structure.

2. The invention in accordance with claim 1 wherein said frame means supporting said upper cup reciprocating support structure further comprises bearing column means.

3. The invention in accordance with claim 2 wherein said upper cup reciprocating support structure is provided with bearing surfaces for contacting said frame means to allow said reciprocal motion of said upper cup reciprocating support structure to be controlled in a vertical reciprocating path.

4. The invention in accordance with claim 3 wherein said bearing surface of upper cup reciprocating support structure is through apertures provided in said upper cup reciprocating support structure.

5. The invention in accordance with claim 4 wherein said frame means supporting said upper cup reciprocating support structure bearing column means are positioned through said through apertures of said upper cup reciprocating support structure.

6. The invention in accordance with claim 5 wherein said single head juice extractor further comprises:

an orifice tube reciprocating support structure supported for reciprocal motion on said frame means;

an orifice tube supported in a cantilevered manner by said orifice tube reciprocating support structure;

means to reciprocate said orifice tube reciprocating support structure.

7. The invention in accordance with claim 6 wherein said frame means supporting said orifice tube reciprocating support structure further comprises a bearing column.

8. The invention in accordance with claim 7 wherein said frame means supporting said orifice tube reciprocating support structure further comprises a bearing means for contacting said frame means to constrain said orifice tube reciprocating support structure to a vertical reciprocating path.

9. The invention in accordance with claim 8 wherein said bearing means of said orifice tube reciprocating support structure is a through passage.

10. The invention is accordance with claim 9 wherein said frame means bearing column reciprocating said orifice tube reciprocating support structure are positioned through said through passage of said orifice tube reciprocating support structure.

11. A single head juice extractor having a processing compartment containing juice extracting elements and a drive containing compartment containing drive linkage elements for driving said juice extracting elements, said drive containing compartment laterally adjacent said processing compartment wherein said juice extracting elements include a fixedly mounted lower cup, a fixedly mounted juice collecting sump mounted below said lower cup, a fixedly mounted strainer tube at least partially contained in said juice collecting sump, an orifice tube positioned for reciprocal motion in said strainer tube, and an upper cup supported for reciprocal motion above and in alignment with said lower cup and said drive linkage elements including a drive means, a plurality of vertically disposed bearing means, an orifice tube reciprocating support structure supported on said bearing means, upper cup reciprocating support structure supported on said bearing means, crank arm means supported for rotary motion connected through rod means to said orifice tube reciprocating support structure, cup drive crank arm means supported for rotary motion connected through upper cup drive rod means to said upper cup reciprocating support structure, said drive means driving said crank means and said cup drive crank arm means to provide vertical reciprocal motion of said upper cup reciprocating support structure and said orifice tube reciprocating support structure.

12. The invention in accordance with claim 11 wherein said orifice tube reciprocating support structure includes a cantilevered arm section extending from said drive containing compartment to said processing compartment wherein said cantilevered arm section of said orifice tube reciprocating support structure is fixedly attached to said orifice tube to provide reciprocal motion in said orifice tube when said orifice tube reciprocating support structure is driven by said drive means.

13. The invention in accordance with claim 11 or claim 12 wherein said upper cup reciprocating support structure includes a cantilevered cup support section extending from said drive containing compartment to said processing compartment wherein said cantilevered cup support section of said upper cup reciprocating support structure is fixedly attached to said upper cup to provide reciprocal motion in said upper cup when said upper cup reciprocating support structure is driven by said drive means.

* * * * *